A. GORDON.
Grain Separator.
No. 36,611. Patented Oct. 7, 1862.
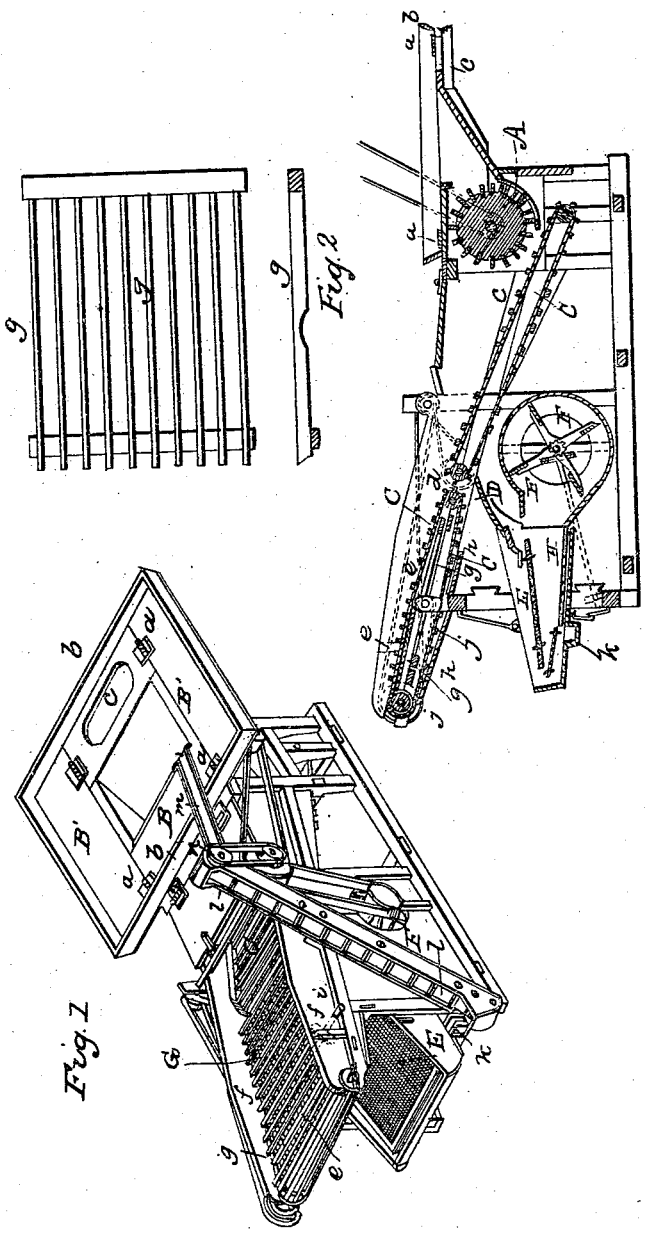

UNITED STATES PATENT OFFICE.

ALEXANDER GORDON, OF ROCHESTER, ASSIGNOR TO JAMES BRAYLEY AND JOHN B. PITTS, OF BUFFALO, NEW YORK.

IMPROVEMENT IN GRAIN-SEPARATORS.

Specification forming part of Letters Patent No. 36,611, dated October 6, 1862.

*To all whom it may concern:*

Be it known that I, ALEXANDER GORDON, of Rochester, in the county of Monroe and State of New York, have invented certain new and useful Improvements in Grain-Separators; and I do hereby declare the following to be a full, clear, and exact description of the same, reference being had to the accompanying drawings, making a part of this specification, in which—

Figure 1 represents a perspective view of a grain thrasher, separator, and conveyer complete, and Fig. 2 represents a longitudinal vertical section through the same.

Similar letters of reference where they occur in the separate figures denote like parts of the machine in both.

In grain thrashing and separating machines a shake-motion has been given to the straw belt or raddle; but though this shake-motion is valuable in shaking out considerable grain that might otherwise be carried out with the straw and lost, yet it also shakes through straw and other stuff which get into the fan-case and on the sieves, and prevent the free action of the machine.

The object of my invention is to retain the advantages of the shake-motion to the raddle and to obviate the disadvantages arising from it—viz., the clogging of the fan or of the sieves by the straw, which by the ordinary construction of separators also passed through the raddle; and the nature of my invention consists in combining with a straw belt or raddle having a shake-motion, a rack or series of slats placed within the belt or raddle for the purpose of preventing the straw from falling through the belt and thence passing into the machine.

To enable others skilled in the art to make and use my invention, I will proceed to describe the same with reference to the drawings.

A represents a thrashing-cylinder working in connection with the ordinary toothed concave; B, the table on which the grain is placed previous to being introduced into the thrasher. The sides B' of this table are hinged at *a*, so as to fold over when the pieces *b b* are raised out of the grooves made in them, and an opening, *c*, is made in the table for the body of the attendant. When the pieces *b* are in place, as shown in the drawings, the leaves of the table are firmly held distended by them.

The grain having been thrashed, it, together with the straw, chaff, &c., falls upon the carrying-belt C, which is furnished with slats to hold the grain from rolling back until they reach the point *d*, where the grain and other small stuff fall upon a directing-board, *d*, and thence to the sieve E, where they are subjected to a blast from a fan-blower, F. At the point *d*, which is the termination of the carrying-belt C, the straw is taken upon the straw belt or raddle G, which is furnished with a series of slats, *e*, that leave a series of openings between them of sufficient size to allow the grains to pass through. This straw belt or raddle G has a shake-motion given to it by cams *f* or otherwise, for the purpose of shaking out any grains that may be in or among the straw and allow them to pass back into the machine to be cleaned, while the straw is continued on out of the machine; but it is found that agitating the straw to divest it of any grain still adhering to it causes the straw to also pass through the raddle, and this straw working back gets into the fan or onto the sieve and injures the free operation of the machine. To obviate this I place a rack, *g*, or slats between the straw-belt, which so closes up the space as to prevent the straw from falling through, but does not interfere with the dropping through of the grains. The grain shaken from the straw either falls immediately upon the directing-board D, or is brought to the directing-board from the inclined board *h* and passes thence to the sieves as the other grain from the machine does. The cams *f* are upon a shaft, *i*, which is rotated by a belt, *j*, but any other known shake-motion may be used in place of the cams, it being only necessary to raise up and let fall the raddle.

The thoroughly-cleaned grain passes out of the machine over the sieve H, while the screenings are conducted to a spout, *k*, and thence into an elevator, *l*, and by a trough or spout, *m*, back into the thrasher, to be rethrashed and recleaned again and again. The trough or spout *m* has a reciprocating motion given to it by means of a pitman attached to a crank-wheel similar to that shown at *n*, but at the opposite end of the shaft on which the wheel *n* is placed. This reciprocating motion prevents the grain or screenings from clogging in said spout.

The parts of the machine which have motion communicated to them may be all be driven from the thrashing-cylinder by means of belts, cogged gearing, or parts by each. In the drawings I have shown each moving part furnished with belt or otherwise, and detailed description is not deemed necessary.

I have shown by a separate figure the slats or rack *g* detached from the machine, so that the construction may be better understood. The straw belt or raddle G and the rack *g* have their slats at right angles to each other, so as jointly to form a lattice-work, one part of which latticed work has a horizontal and vertical motion, the other part being stationary, as described.

Having thus fully described the nature and object of my invention, what I claim therein as new, and desire to secure by Letters Patent, is—

In combination with a straw belt or raddle having a shake-motion communicated to it, a rack or series of slats placed within the straw-belt for the purpose of preventing the straw from working through and getting back into the machine, but without preventing the grains from going through, substantially as described and represented.

ALEXANDER GORDON.

Witnesses:
  REUBEN BLOSS,
  D. DE GARNIER.